March 18, 1941. J. G. RIEFF 2,235,564
PRUNING IMPLEMENT
Filed March 29, 1939
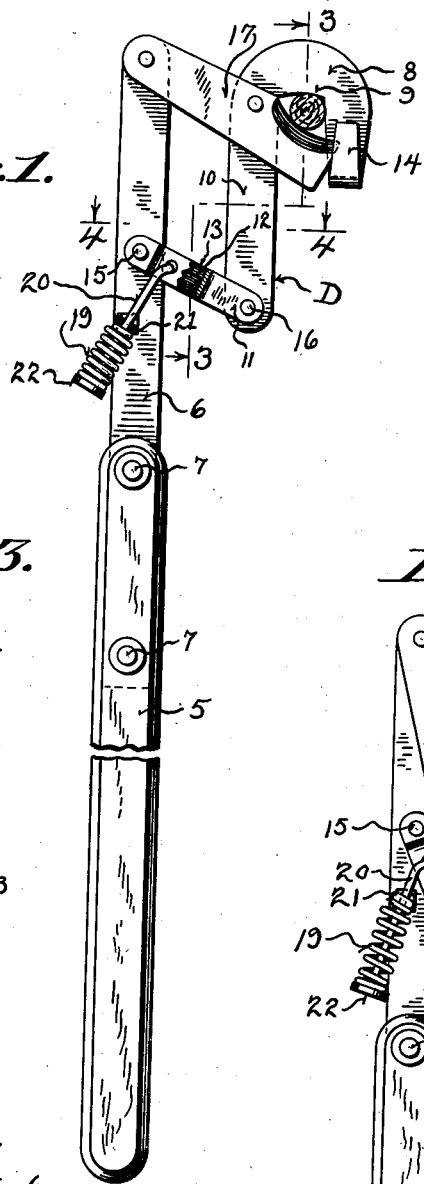
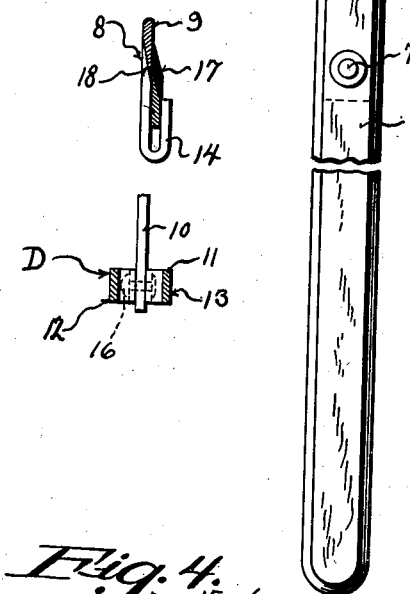
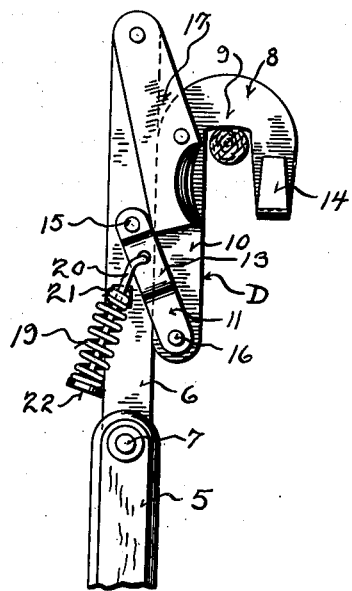
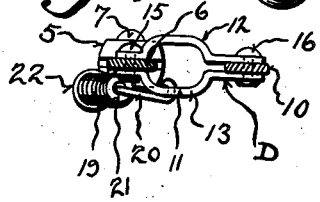
Inventor
J. G. Rieff
By
Attorneys Patented Mar. 18, 1941

2,235,564

UNITED STATES PATENT OFFICE 2,235,564

PRUNING IMPLEMENT

John G. Rieff, London, Wis.

Application March 29, 1939, Serial No. 264,719

1 Claim. (Cl. 30—246)

This invention appertains to pruning devices, and more particularly to a novel device for severing overhead branches, twigs, and the like.

One of the primary objects of my invention is to provide a pruning device which can be conveniently and expeditiously operated with one hand, thereby eliminating the necessity of an operator having to simultaneously engage a branch and actuating handles for cutting the branch.

Another salient object of my invention is to provide a pruning device embodying a manipulating handle having a branch-engaging hook, and means for automatically severing the branch engaged by the hook upon pull on the handle.

A further object of my invention is to provide a pruning implement embodying a manipulating handle having a forwardly projecting arm, a hook having a shank arranged in parallel relation to the arm, and parallel operating links pivotally connecting the shank and arm together, with a cutting blade formed on one of the links, the arrangement being such that when the hook is engaged over a branch and a downward pull is exerted on the handle, the cutting blade will be automatically actuated to sever the branch.

A further important object of my invention is the provision of guide means formed on the hook for receiving the cutting knife at the time the knife initially engages the branch, whereby lateral shifting movement of the hook and knife relative to one another and to the branch will be eliminated.

A still further important object of my invention is to provide a pruning implement of the above character which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a side elevational view of my improved pruning implement, with parts thereof broken away and in section to illustrate structural details.

Figure 2 is a fragmentary, side elevational view of the implement, showing the same hooked over a branch and prior to the placing of downward pull on the handle.

Figure 3 is a detail, vertical, sectional view taken on the line 3—3 of Figure 1, looking in the direction of the arrows.

Figure 4 is a detail, horizontal, sectional view taken on the line 4—4 of Figure 1, looking in the direction of the arrows.

Referring to the drawing in detail, wherein similar reference characters designate corresponding parts throughout the several views, the letter D generally indicates my improved pruning appliance, and the same includes a manipulating handle 5, which can be formed from wood or any other preferred material. The forward end of the handle 5 carries the outwardly extending arm 6, which can be formed from strap metal. The handle 5 is preferably slotted to receive the arm 6, and the arm is securely fastened to the handle by means of rivets or the like 7.

Arranged at one side of the arm 6 is a branch- or twig-engaging hook 8. This hook 8 includes a bill 9 and a shank 10, which is arranged in parallel relation to the arm. The shank 10 is connected to the arm 6 by means of an inner link 11 and a spaced parallel outer link 12. The inner link 11 can consist of duplicate companion sections 13 disposed on opposite sides of the arm 6 and the shank 10, and the sections are preferably bowed outwardly, as shown. The outer free end of the bar 9 of the hook 8 is folded back upon itself in spaced parallel relation to form a guide 14. The links 11 and 12 are pivotally connected to the arm 6 by pivot pins or rivets 15, and the outer ends of the links 11 and 12 are pivotally connected to the shank 10 of the hook 8 by means of pivot pins or rivets 16.

The extreme outer end of the upper link 12 has formed thereon an arcuate cutting knife 17, which extends beyond the shank 10 of the hook, and this knife is adapted to swing into and toward the bill of the hook, as is clearly shown in Figure 1, when pull is exerted on the handle 5, as will be later set forth. If desired, the inner edge of the bill of the hook can be sharpened, as at 18, to facilitate the severing of the branch and for co-operation with the knife blade 17.

In order to normally hold the knife blade 17 away from the bill of the hook and the shank 10 of the hook against the arm 6, the hook is pulled downward by an expansion coil spring 19. This spring is coiled about a guide rod 20, which has its upper end pivotally fastened to one of the sections 13 of the lower link 11. The guide rod extends loosely through a guide eye 21 carried by the arm 6. The lower end of the rod carries a head 22. One end of the spring fits against the head 22, and the other end against the guide eye 21, and, consequently, normally exerts a downward pressure on the guide rod and the lower link 11.

In use of my device, the handle 5 is gripped in both hands, and the bill of the hook 8 is placed over a branch to be severed, after which downward pull is exerted on the handle. This downward pull will actuate the parallel links 11 and 12, and the cutting blade 17 will be swung into forcible engagement with the branch, and the blade cooperating with the cutting edge 18 will quickly and effectively sever the branch. As the blade 17 rides into engagement with the branch to be cut, the nose of the knife will ride between the bill of the hook 8 and the guide arm 14, and, consequently, lateral shifting of the outer end of the knife blade 17 will be prevented.

Changes in details may be made without departing from the spirit or the scope of this invention, but what I claim as new is:

A pruning implement comprising, a manipulating handle, a forwardly extending arm on the handle, a hook including a shank arranged in parallel relation to the arm, spaced parallel links pivotally connecting the shank to the arm, a forwardly projecting cutting blade carried by one of the links and movable into operative engagement with the inner edge of the hook when the hook and handle are moved in opposite directions, a bent-back guide for the free end of the blade carried by the outer end of the hook, spring means normally holding the hook in a lowered position and the shank against the arm, said spring means including a guide rod pivotally connected to one of the links, a guide eye on the arm slidably receiving the rod, a head on the lower end of the rod, and an expansion spring on the rod confined between the head and the eye.

JOHN G. RIEFF.